(12) United States Patent
Menon et al.

(10) Patent No.: US 10,429,627 B2
(45) Date of Patent: Oct. 1, 2019

(54) COMPUTATIONAL MICROSCOPY THROUGH A CANNULA

(71) Applicant: University of Utah Research Foundation, Salt Lake City, UT (US)

(72) Inventors: Rajesh Menon, Salt Lake City, UT (US); Ganghun Kim, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 237 days.

(21) Appl. No.: 14/950,371

(22) Filed: Nov. 24, 2015

(65) Prior Publication Data

US 2016/0147054 A1 May 26, 2016

Related U.S. Application Data

(60) Provisional application No. 62/083,798, filed on Nov. 24, 2014.

(51) Int. Cl.

| G02B 21/04 | (2006.01) |
|---|---|
| G02B 21/06 | (2006.01) |
| H04N 5/225 | (2006.01) |
| G06K 9/46 | (2006.01) |
| G06K 9/52 | (2006.01) |

(Continued)

(52) U.S. Cl.
CPC ............ *G02B 21/06* (2013.01); *G02B 21/16* (2013.01); *G02B 21/361* (2013.01); *G06K 9/4652* (2013.01); *G06K 9/4661* (2013.01); *G06K 9/52* (2013.01); *H04N 5/2256* (2013.01); *G06K 2009/4666* (2013.01); *H04N 2005/2255* (2013.01)

(58) Field of Classification Search
CPC ...... G02B 21/06; G02B 21/16; G02B 21/361; G06K 9/4652; G06K 9/4661; G06K 9/52; H04N 5/2256
See application file for complete search history.

(56) References Cited

U.S. PATENT DOCUMENTS

| 4,718,417 A | 1/1988 | Kittrell et al. | |
|---|---|---|---|
| 6,975,898 B2 * | 12/2005 | Seibel ................ | A61B 1/00048 600/473 |
| 7,517,695 B2 | 4/2009 | Haidekker | |

(Continued)

OTHER PUBLICATIONS

Prebhat et al, Bringing Superresolution To Fluorescence Microscopy; BioPhotonics; May 2010.

(Continued)

*Primary Examiner* — Christopher G Findley
(74) *Attorney, Agent, or Firm* — Thorpe North & Western, LLP

(57) ABSTRACT

An imaging system can include an optical fiber and a light source for providing optical stimulation to a region of interest along the optical fiber. A camera can capture emission such as fluorescence resulting from the optical stimulation. A cannula configured for implantation into a subject can be configured to direct the emission from the subject. A mating sleeve coupling the cannula to the optical fiber, and configured to support the camera, can include a dichroic mirror to allow the optical stimulation to pass from the optical fiber to the cannula and to redirect the emission from the cannula to the camera.

22 Claims, 12 Drawing Sheets

(51) Int. Cl.
*G02B 21/36* (2006.01)
*G02B 21/16* (2006.01)

(56) References Cited

U.S. PATENT DOCUMENTS

| | | |
|---|---|---|
| 8,038,602 B2 | 10/2011 | Gill et al. |
| 8,062,215 B2 | 11/2011 | Voegele et al. |
| 8,167,794 B2 | 5/2012 | Matsumoto et al. |
| 8,317,689 B1 | 11/2012 | Remijan et al. |
| 8,382,812 B2 | 2/2013 | Kang et al. |
| 8,439,830 B2 | 5/2013 | McKinley et al. |
| 8,556,806 B2 | 10/2013 | Farr |
| 8,744,570 B2 | 6/2014 | Lee et al. |
| 8,838,213 B2 * | 9/2014 | Tearney ............. A61B 18/22 600/478 |
| 2003/0078477 A1 | 4/2003 | Kang et al. |
| 2008/0058592 A1 | 3/2008 | Jones |
| 2009/0088680 A1 * | 4/2009 | Aravanis ............. A61K 48/005 604/21 |
| 2009/0303317 A1 | 12/2009 | Tesar |
| 2016/0022119 A1 * | 1/2016 | Shahmoon ......... A61B 1/00096 600/182 |

OTHER PUBLICATIONS

Cui et al, Deep Brain Optical Measurements Of Cell Type-Specific Neural Activity In Behaving Mice; Nature Protocols; May 5, 2014; pp. 1213-1228; vol. 9.

Doriclenses, Fiber Optic cannulas; http://doriclenses.com; http://doriclenses.com/life-sciences/241-fiber-optic-cannulas; Accessed Jul. 28, 2014.

Flusberg et al, Fiber-Optic Fluorescence Imaging; Nature Methods; Dec. 2005; pp. 941-950; vol. 2 Issue 12.

Warden et al, Optical Neural Interfaces; Annual Review Of Biomedical Engineering; Jul. 2014; pp. 103-129; vol. 16.

* cited by examiner

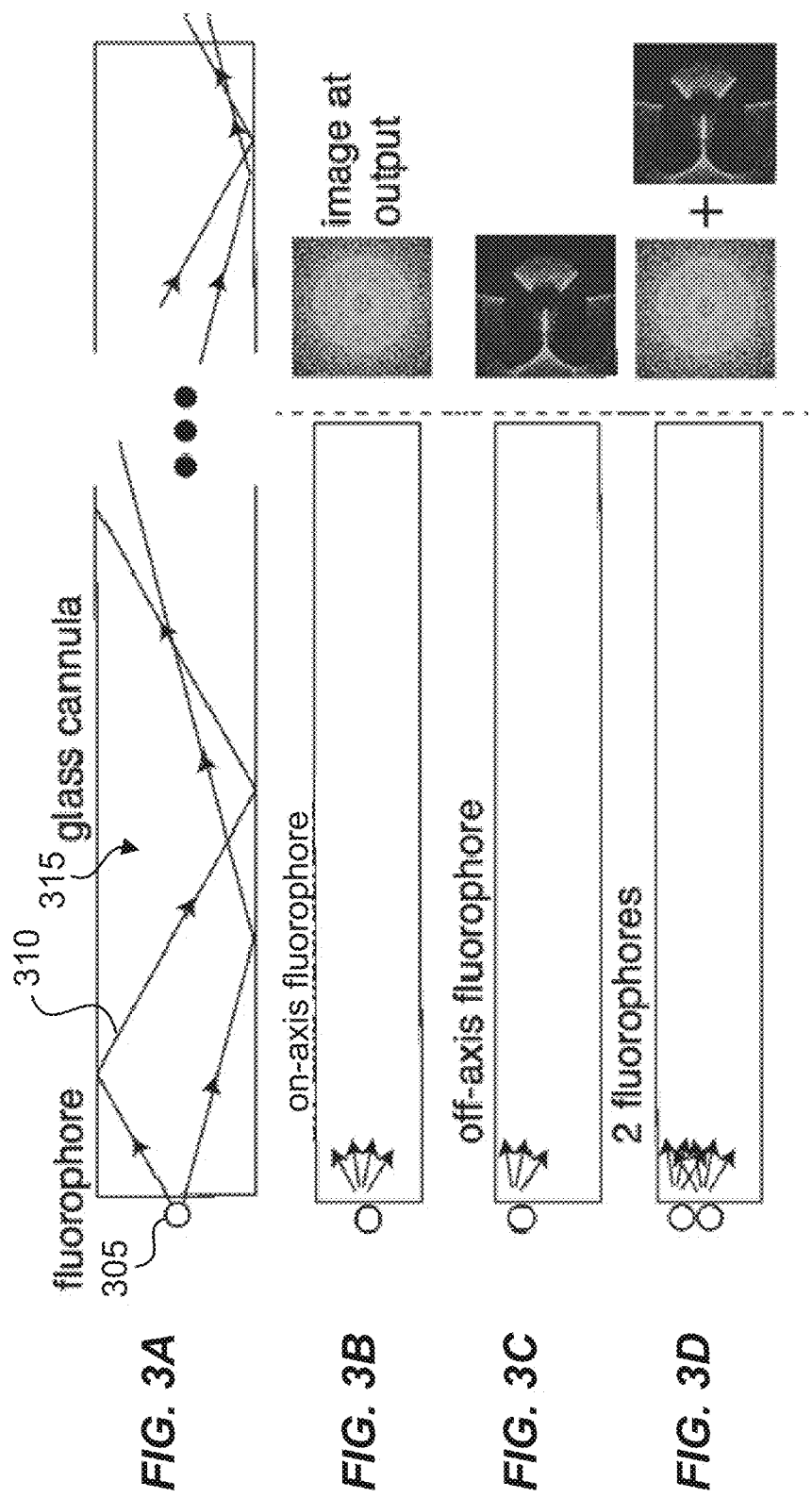

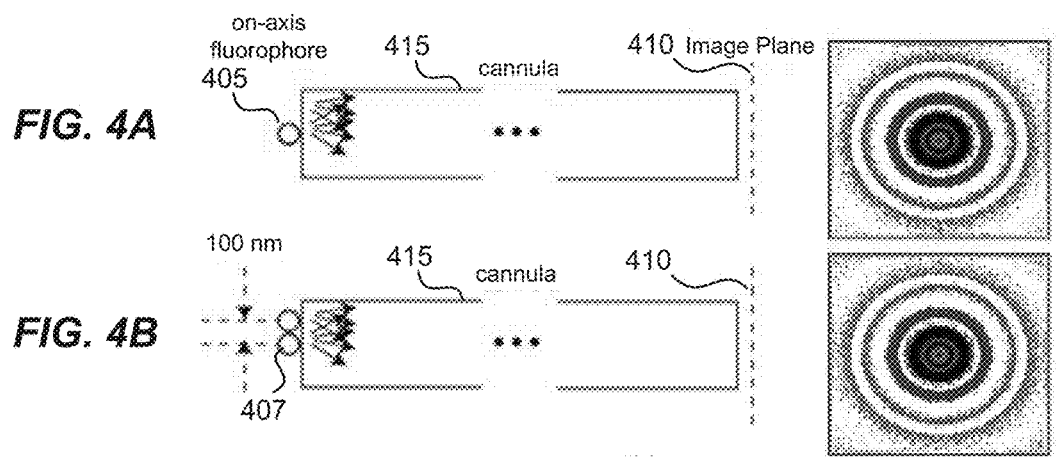
FIG. 4A
FIG. 4B
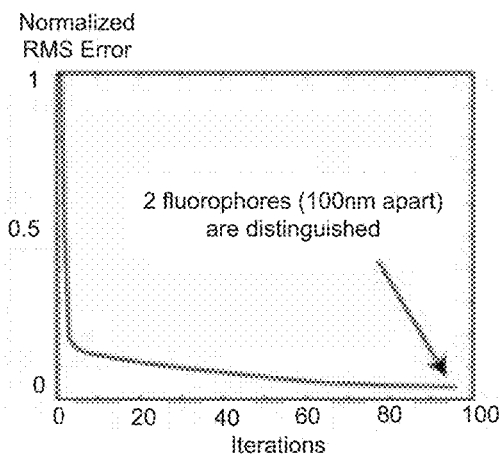
FIG. 4C
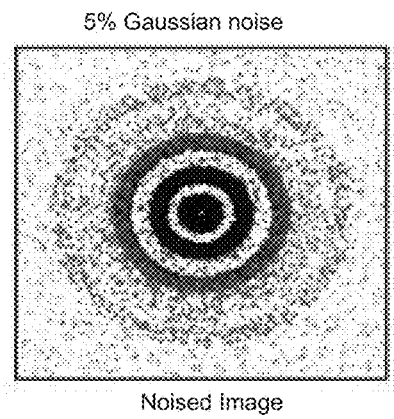
FIG. 4D
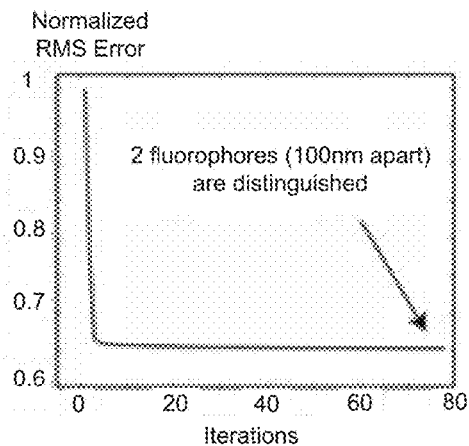
FIG. 4E

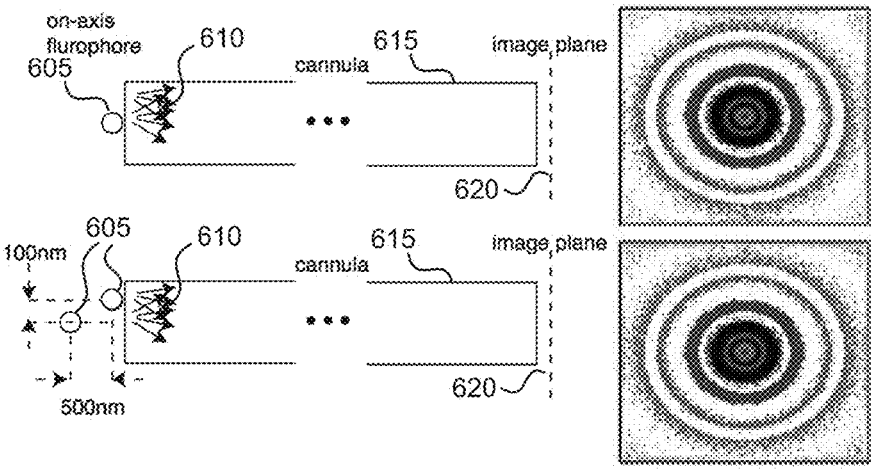
FIG. 6A
FIG. 6B
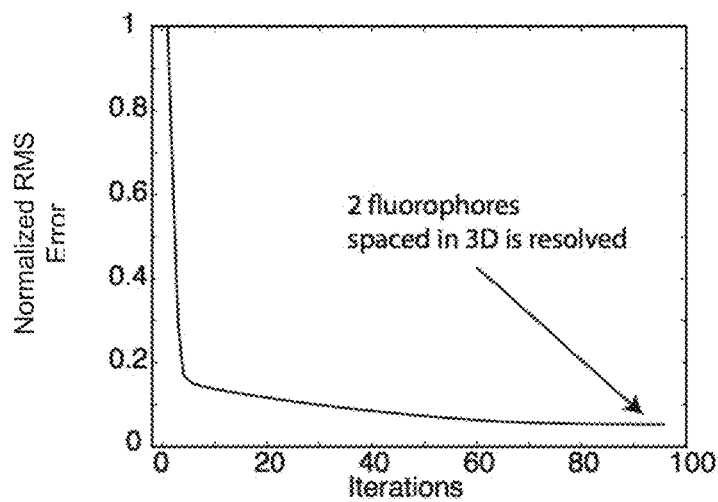
FIG. 6C

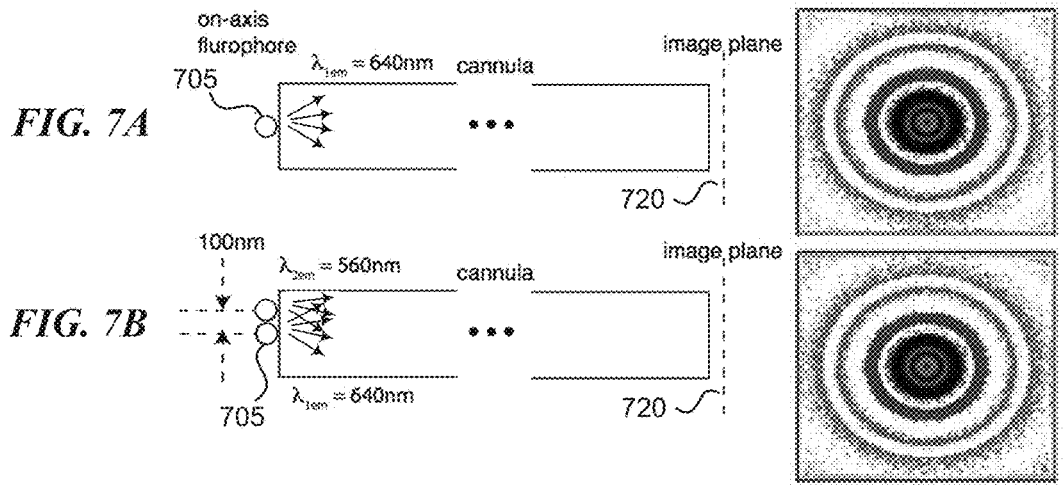
*FIG. 7A*
*FIG. 7B*
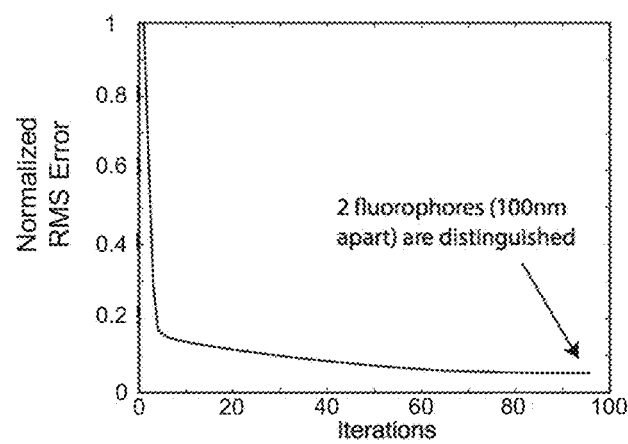
*FIG. 7C*

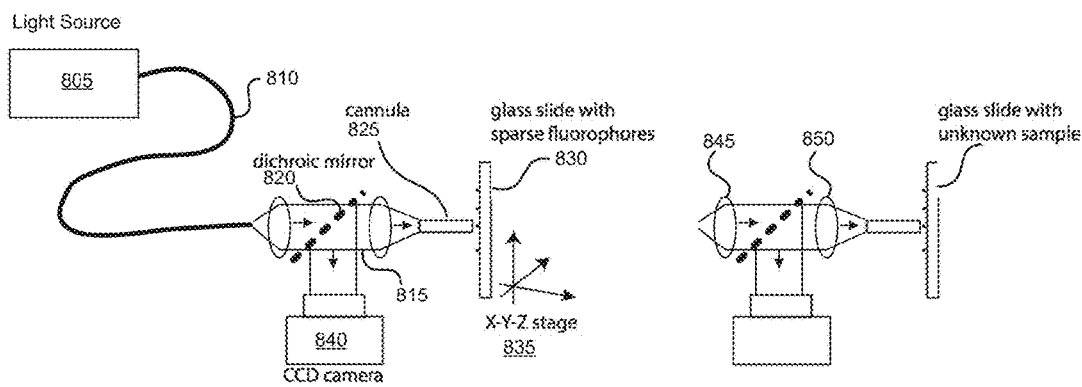
*FIG. 8A*  *FIG. 8B*
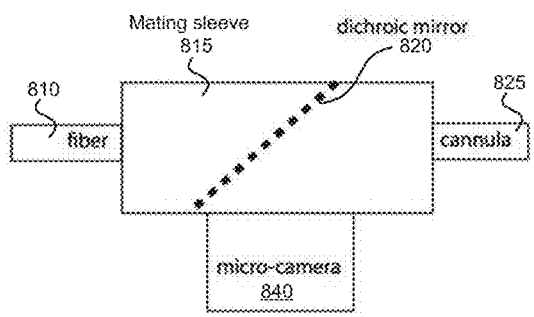
*FIG. 8C*
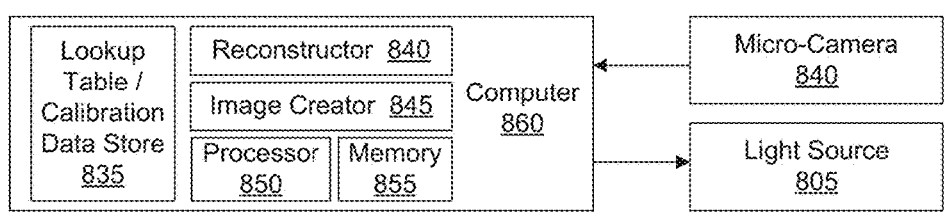
*FIG. 8D*

COMPUTATIONAL MICROSCOPY THROUGH A CANNULA

RELATED APPLICATION

This application claims priority to U.S. Provisional Application No. 62/083,798, filed Nov. 24, 2014, which is incorporated herein by reference.

BACKGROUND

Recent genome wide association studies suggest that genes whose function mediates and modulates neural circuits affect a wide variety of behaviors ranging from social behaviors to focused repetitive behaviors. However the causal basis for these associations is not clear.

The Cappecchi lab has identified a mouse where altered microglia function, the immune system of the brain, appears causal for a distinct behavioral change. Further, a bone marrow transplant prevents this repetitive behavior. In the mouse, alteration in the immune system (microglia) is directly linked with behavioral change. Mice with a mutation in the Hoxb8 gene show unexpected behavior manifested by repetitive grooming behavior.

There are two principle sources of microglia in mammals: a resident population that is present in the brain early during embryogenesis prior to vascularization, and a second population derived from bone marrow that enters the brain after birth. Hoxb8 exclusively labels the bone marrow population. Having demonstrated a direct relationship between altered microglia and a behavioral change, how microglia interacts with neural circuits and affects behavior can be determined. Further, how alteration in microglial function induces changes in neural circuit function and leads to distinct behavioral change in awake behaving mice can be determined.

Conventional technology has been unable to precisely measure the fate of microglia or neurons that are activated by optogenetic stimulations. The most common imaging modality for a live mouse brain is two-photon confocal fluorescence microscopy. In two-photon confocal fluorescence microscopy, a femtosecond laser is tightly focused through the brain tissue. Due to the high intensities at the focus, two-photon fluorescence is induced at the focus and the signal photons are collected. Two-photon confocal fluorescence microscopy allows for penetrating into the brain tissue up to ~1 mm. Resolution in the order of a few micrometers has been demonstrated. Unfortunately, this technique typically involves an expensive and complicated equipment setup. Two-photon confocal fluorescence microscopy further involves scanning the focal spot, which reduces temporal resolution. The imaging speed can be increased at higher excitation power, but this also typically causes damage in living tissue.

In conventional optical microscopy (including 2-photon microscopy), resolution is limited by diffraction to about half the excitation wavelength. In the case of 2-photon microscopy, this excitation wavelength is half of the laser wavelength, which is typically in the infrared. Therefore, spatial resolution is still limited. Recently, several methods have allowed production of images which are not diffraction limited in the far field. A family of methods called Reversible-Saturable-Optical-Fluorescence Transitions (RESLOFT) use the transition between bright and dark states to selectively illuminate the sample in a region smaller than the diffraction limit.

Saturated-Structured-Illumination Microscopy (SSIM9) and Saturated-Pattern-Excitation Microscopy (SPEM10) use Moire fringes to move higher spatial frequencies into the optically resolvable region limited by diffraction. These Moire fringes are generated by the product of the local density of fluorescent probes attached to the sample and the excitation light. While a similar method using linear illumination microscopy is capable of improving the resolution by a factor of two, an emission rate, which depends nonlinearly on the illumination intensity can produce a theoretical unlimited resolution. Such emission rate is obtained by illuminating the sample with a sinusoidal pattern with peak intensity that is higher than the emission rate of the fluorophore. The result is emission with a non-sinusoidal rate, which contains higher spatial frequencies than the illumination pattern itself.

A different approach is taken in the related approaches termed Stochastic-Optical-Reconstruction Microscopy (STORM) and Photoactivation-Localization Microscopy (PALM). In these methods, photoactivatable molecules are used to perform time-multiplexed superresolution. A pump laser beam illuminates the fluorescent molecules. This pump illumination statistically activates some of the molecules into a fluorescing state. Since the active molecules are well separated (i.e., they are spatially sparse compared to the diffraction limit), they can be localized by Gaussian fitting. The molecules are then photobleached and another cycle of activation-localization-photobleaching is performed. With a sufficient number of such cycles, every fluorophore in a given field of view can be probed. Finally, the localization data is used to reconstruct a super-resolved image. Although this technique is widefield, a large number of frames are used for high-resolution imaging, which makes this technique slow. Furthermore, in its conventional implementation, only sliced brain tissue can be imaged since a full confocal microscope is used.

FIGS. 1A-1C illustrate some example conventional imaging technologies. FIG. 1A illustrates Stimulated Emission Depletion (STED) microscopy. A focused spot excites fluorescence. A ring-shaped beam quenches fluorescence from everywhere except its center. The signal is then collected from a sub-diffraction-limited region at the center of the second beam. FIG. 1B shows a comparison of a confocal image (background) and a STED image (inset overlay) of the mitochondrial inner membrane. FIG. 1C illustrates a schematic of Photoactivation Localization Microscopy (PALM) techniques. A PALM image is comprised of multiple frames taken at different instances of time that are post-processed into a single image.

Computational imaging through a multi-mode fiber has been used previously. In this case, light from the object is scrambled due to multiple spatial modes in the optical fiber. Complicated interferometer-based calibration systems coupled with speckle imaging methods were used to reconstruct the object details computationally. Unfortunately, the resolution of such an approach is limited and extension to sub-wavelength dimensions is not readily feasible. Related to this method, other groups have focused a spot through multi-mode fibers and scanned the spot to create images. However, these approaches are limited in speed, field of view and resolution. Furthermore, all these techniques tend to require fairly complex and sensitive hardware, at least for the calibration process.

SUMMARY

An imaging system can include an optical fiber and a light source which provides optical stimulation to a region of interest along the optical fiber. A camera can capture fluorescence resulting from the optical stimulation. A cannula configured for implantation into a subject can be configured to direct the fluorescence from the subject. A mating sleeve coupling the cannula to the optical fiber, and configured to support the camera, can include a dichroic mirror to allow the optical stimulation to pass from the optical fiber to the cannula and to redirect the fluorescence from the cannula to the camera.

In one optional aspect, the light source can be a blue or white light source, although broadband or other light sources can be used.

Typically, the system can also include an image reconstruction module which is operatively connected to the camera and adapted to receive the fluorescence and reconstruct an image. The reconstruction module may be specialized hardware configured to perform the reconstruction or may be a general purpose computer (desktop or portable) with specialized firmware or software which is configured to perform the reconstruction. Such a system can optionally reconstruct the image using a linear combination model of intensity distributions. The linear combination model can be a two-dimensional model, or a three-dimensional model. In some aspects, the linear combination model can also account for variations in wavelength of fluorescence such that the model and resulting images are multi-color.

The image reconstruction module can use any suitable technique to reconstruct images from the fluorescence. Non-limiting examples of suitable techniques can include at least one of STORM or PALM-based techniques.

In one alternative aspect, the camera can be a micro-camera. Non-limiting commercial examples of suitable micro-cameras can include the naneye sensor from Awaiba or any camera that is small enough to fit within the diameter of the cannula.

The above system can be advantageously used to produce super-resolution images of a variety of materials, including, but not limited to, living tissues, sampled tissue, inorganic samples, and the like. Accordingly, a method of using the system can include preparing a sample (e.g. surgical removal of tissue, surgical exposure of living tissue, etc). The cannula can then be associated with the region of interest. Imaging ranges can typically be about same as the inner diameter of the cannula. Although sizes can vary, cannula inner diameters can range from about 100 µm to about 5 mm. When capturing three-dimensional images, imaging depth can be a function of the size of the cannula (diameter and length), the wavelength of the signal, presence of scattering tissue, etc., and will most often range from about 10 µm to about 2 mm. The light source can be activated to provide an illumination light to the region of interest. As materials within the region of interest responsively fluoresce, the fluorescence can be captured by the camera. An image of the region of interest can then be produced from the fluorescence. Furthermore, alternative signals such as scattered, reflected or transmitted light or 2-photon or multi-photon fluorescence can also be used. If the signal is incoherent, then a linear combination of intensities is sufficient for the reconstruction model. If the signal is coherent (for example scattered light from a laser), then the calibration can also measure the phase as well as the amplitude, and a linear combination of the complex field is can be used for the reconstruction model.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 3A-3D illustrate the results of fluorescence in a cannula, including the additive effect when two fluorophores are present, in accordance with an embodiment of the present technology;

FIG. 4A-4E illustrates an example of resolving two fluorophores spaced 100 nm apart in accordance with an embodiment of the present technology;

FIG. 6A-6C illustrates an example of illustrating fluorophores in three dimensions in accordance with an embodiment of the present technology;

FIG. 7A-7C illustrates an example of imaging of two different fluorophores emitting at different wavelengths in accordance with an embodiment of the present technology;

FIG. 8A-8D illustrate a schematic diagram of several imaging systems in accordance with embodiments of the present technology;

DETAILED DESCRIPTION

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Further, any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

While much of the following description relates to computational multi-color fluorescence nanoscopy and optogenetic stimulation of neuronal circuits in a mouse brain, the present technology described for use in this context comprises a computational cannula-based imager capable of imaging with sub-100 nm resolution the molecules released from neurons and microglia in the mouse brain while simultaneously optically stimulating the same region for optogenetics in awake behaving mice. By combining super-resolution fluorescence nanoscopy and optical stimulation in a single optically transparent cannula-based device, the presence and concentration of released molecules across the junction between neuron and microglia in response to pico-second optogenetic activation and silencing can be measured.

Figure 1A:
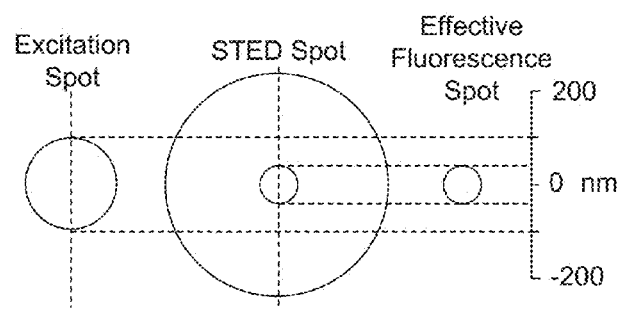
FIGS. 1A-1C illustrate conventional imaging techniques, including STED and PALM imaging.
Figure 1B:
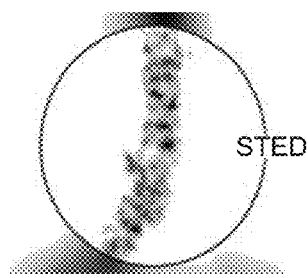
Figure 1C:
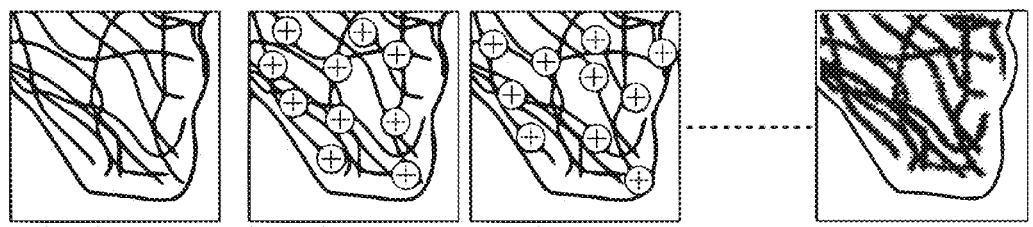
Figure 2A:
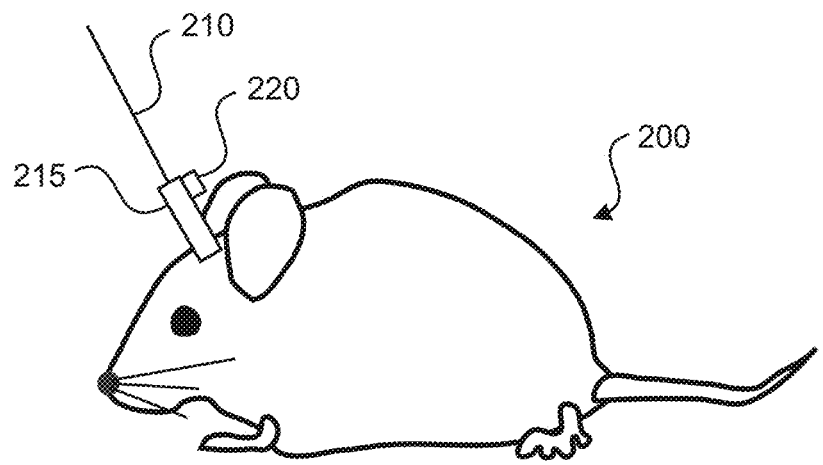
FIGS. 2A-2B illustrates a system for simultaneous optical stimulation and super-resolution nanoscopy in accordance with an embodiment of the present technology.
Figure 2B:
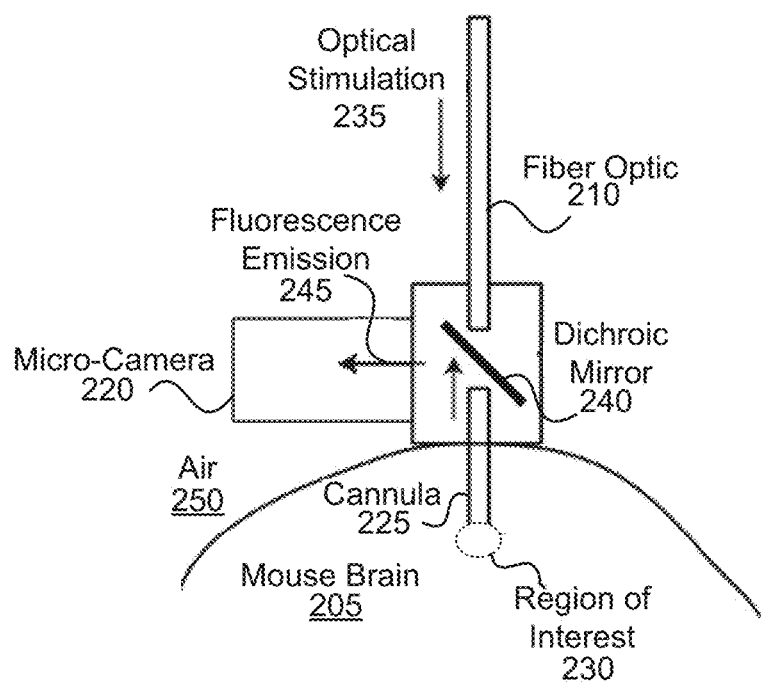

FIGS. 2A-2B illustrate an approach for simultaneous optical stimulation and super-resolution nanoscopy. FIG. 2A illustrates a mouse 200 implanted with a fiber-optic cannula (225, FIG. 2B) for optical stimulation. A miniaturized imaging system illustrated in FIGS. 2A-2B as a micro-camera 220 can be used. FIG. 2B depicts optical stimulation 235 from a suitable energy or light source and a corresponding imaging system. A dichroic mirror 240 allows optical stimulation to pass through and into the cannula 225 into the region of interest 230. Stimulated fluorophores within the region of interest form a fluorescence emission 245 which passes back through the cannula 225. The dichroic mirror 240 redirects fluorescence photons (e.g. fluorescence emission 245) onto the micro-camera 220. The cannula 225 can be a standard commercial glass cannula, optical fiber, optical waveguides, scattering medium, diffusive medium, solid or hollow needle, solid or hollow needle with reflective and/or scattering inner walls, fiber bundles, multi-core optical fibers, and any light transporting device that generates a deterministic and fixed transfer function from input to output, although other suitable conduits or waveguides can be used. Use of a commercially available (conventional) cannula 225 can considerably simplify the surgical procedure on the mouse 200. The system outside of the implantation into the region of interest 230 may be exposed to the air 250.

With a micro-camera 220 incorporated onto a sleeve 215 for mating the optical fiber 210 with the cannula 225 system, a dichroic mirror 240, incorporated into the sleeve 215, can be used to redirect the fluorescence photons emitted as fluorescence emission 245 from region of interest 230 on the subject (e.g., the mouse brain 205) to the micro-camera 220. With this arrangement and the further implementation details described below, super-resolution computational imaging can be achieved which allows the creation of images with a resolution of less than 100 nm without any additional optics (other than the cannula 225, optical fiber 210, and dichroic mirror 240, which are used as light guides). In some cases the cannula can be rigid.

One application of the nanoscopy device or imager can be to determine how the Hoxb8 mutation perturbs microglia and subsequently affects neural circuits, circuit dynamics and behavior at fundamental cellular and systems level. Specifically, the imager can be an in vivo super-resolution fluorescence imager that can dynamically image the microglia or neuron and related biomolecules released by microglia or neuronal cells during optogenetic stimulation using fluorescent markers. Using nanoscopy based technology mechanisms of microglia-neuronal interaction underlying repetitive behavior can be identified. The Hoxb8 mouse model is used to link microglia-neuronal interaction to behaviors, as no other mechanism is presently known whereby activation of selected microglia population leads to a behavioral change under an optogenetic regime. The technology described here provides a platform to address these questions related to microglia-neuronal interaction, enables specific optical readouts from distinct microglia and neurons, and enables capture of quantitative and qualitative optical information at a nanoscopic level about the molecules released by microglia and neurons during behavioral shifts. The present technology provides an implementation of a PALM-like modality, which allows for imaging through a cannula.

The technology is based upon the idea that the glass cannula that is surgically inserted into the mouse brain essentially acts as a light guide. Rays of light undergo total-internal reflection (TIR) at the inner surface of the cannula and are guided from one end to the other. This is the basic principle of the use of the cannula for optogenetic stimulation that delivers light from the fiber input to the end of the cannula inside the mouse brain (or other target tissue) as illustrated in FIG. 2B.

The cannula can also guide light emitted from inside the brain (such as from a fluorophore) out in a similar manner as shown in FIG. 3A. Rays of light 310 from a fluorophore 305 inside the mouse brain are guided by total-internal reflection (TIR) in the glass cannula 315 to the outside of the mouse brain. The light intensity distribution at the far-end of a light guide (e.g., glass cannula 315) is sensitive to the location of the light source at the other end. A fluorophore 305 located on the optical axis of the cannula 315 will form a rotationally symmetric intensity distribution at a plane just outside the far-end of the cannula 315, as is shown in FIG. 3B. If the fluorophore is shifted off-axis, as shown in FIG. 3C, then the intensity distribution at the far-end changes drastically. If the intensity distribution outside the mouse brain near the end of the cannula is calibrated as a function of the location of the fluorophore, then optimization methods can be used to estimate the location of the fluorophore based on the specific cannula geometry. In particular, if two fluorophores are present, since they are incoherent sources of photons, the intensity distributions of these fluorophores add in amplitude only (not in phase). This is illustrated in FIG. 3D. Thus, any arbitrary distribution of fluorophores can be modeled as a linear combination of a basis set of intensity distributions. If this basis set is well known, either by careful calibration or simulations, then robust optimization algorithms can be applied to reconstruct the locations of almost any arbitrary distribution of fluorophores.

As will be described, this technique can also be applied to perform 3D (three-dimensional) and multi-color imaging. Furthermore, this technique can resolve fluorophores that are spaced by a distance smaller than the far-field diffraction limit, essentially enabling super-resolution microscopy. This technique may be referred to as Light-guided Computational Superresolution Imaging (LCSI). The micro-camera 220 in FIG. 2B is used to image the plane right outside the cannula 315 shown by dashed lines in FIG. 3B-3D. A principle of LCSI is that any image can be represented as a linear sum of single fluorophore images, $(\rho,)=\Sigma_{i,j=1}^{N_1, N_2} \alpha_{i,j} I_o(\rho_i, \theta_j)$, where radial symmetry is assumed, and i, j represent the single-fluorophore locations (calibration data). The coefficients $\alpha_{i,j}$ are the unknowns, which can be estimated using a modified version of the direct-binary-search (DBS) algorithm with the objective of minimizing the error, $\varepsilon=1/N_1 N_2 |I_{measured}-I|$. The error is the difference between the measured image and reconstructed image using an estimation of the coefficients, $\alpha_{i,j}$. These principles, while not rigorously repeated in this document, may be understood by one of skill in the art having experience with variations of the DBS algorithm. Non-limiting examples of such techniques are outlined in Ganghun Kim and R. Menon, "An ultra-small 3D computational microscope,"*Appl, Phys. Lett.* 105 061114 (2014); P. Wang and R. Menon, "Computational spectroscopy based on a broadband diffractive optic," *Opt. Exp.* 22(12), 14575-14587 (2014); P. Wang, T A. Dominguez-Caballero, D. Friedman and R. Menon, "A new class of multi-bandgap high efficiency photovoltaics enabled by broadband diffractive optics,"*Progress in Photovoltaics: Research & Applications* (DOI: 10.1002/pip.2516); P. Wang, C. G. Ebeling, J. Gorton and R. Menon, "Hyperspectral imaging in scanning-confocal-fluorescence microscopy using a novel broadband diffractive optic." *Opt. Commun.* Vol 324, p. 73-80 (2014); and B. Shen, P. Wang and R. Menon, "Optimization and analysis of 3D nanostructures for power-density enhancement in ultra-thin photovoltaics under oblique illumination," *Opt. Exp.* 22(52) A311-A319 (2014), which are each incorporated herein by reference. Alternatives to the DBS approach can include, but are not limited to, any nonlinear optimization method such as the gradient descent method, simulated annealing, swarm-based optimization, genetic algorithms, compressed-sensing-based algorithms, deep-learning algorithms, least-squares optimization, and optimization-based and linear-algebra-based techniques that are able to solve the corresponding linear system of equations.

Once the error is minimized, the coefficients $\alpha_{i,j}$ indicate whether a fluorophore is present at that location (i,j) or not. The non-integer values of $\alpha_{i,j}$ determine the lightfield information, which can be further exploited for 3D and super-resolution.

FIG. 4A-4E illustrate aspects of a numerical simulation of the situation of two fluorophores that are spaced 100 nm. FIG. 4A illustrates a schematic and resulting image of an on-axis fluorophore 405. FIG. 4B illustrates a schematic and resulting image where two fluorophores 407 are present and spaced 100 nm. FIG. 4C is a graph of the root mean square (RMS) error as a function of iteration number. At the end of the iterations, the two fluorophores 407 are clearly distinguished as separate light spots. FIG. 4D illustrates an image of both fluorophores with 5% Gaussian noise. FIG. 4E is a graph of root mean square (RMS) error as a function of the number of iterations. At the end of the iterations, the two fluorophores 407 are clearly distinguished even in the presence of the noise.

With continued reference to FIG. 4A and 4B, as seen by the camera, the image at the image plane 410 right after the cannula 415, shown by the dashed lines at the end of the cannula in FIG. 4A and FIG. 4B, is shown on the right of the dash line for each case. The small displacement of the fluorophore does not change the image significantly. However, the minute change is sufficient for the direct binary search (DBS) algorithm to recognize the presence of two fluorophores as indicated by the plot of the error between the reconstructed image and the measured image as a function of the iteration number as illustrated in FIG. 4C.

At the end of the iterations in FIG. 4C, both fluorophores are clearly distinguished. The DBS algorithm is extremely tolerant to noise. A simulation of the same two fluorophores with added Gaussian noise with an intensity corresponding to 5% of the peak of the original image is shown in FIG. 4D. Even in the presence of noise, the algorithm is able to clearly minimize the error and distinguish the two fluorophores as illustrated in FIG. 4E. Although the error is larger due to the presence of noise, thresholding algorithms can be applied to extract the fluorophore locations from background noise.

Figure 5A:
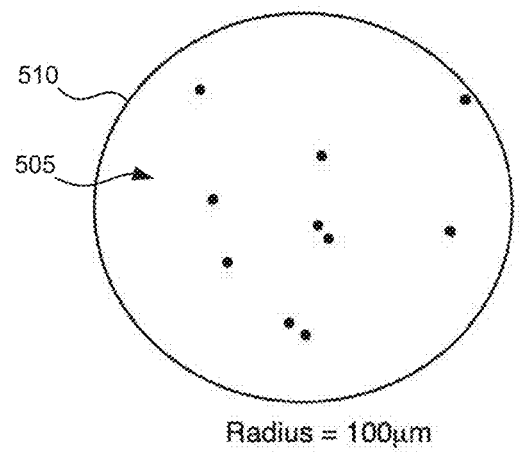
FIG. 5A-5C illustrate examples of a simulation for imaging a general distribution of fluorophores using the present technology in accordance with an example.
Figures 5B, 5C:
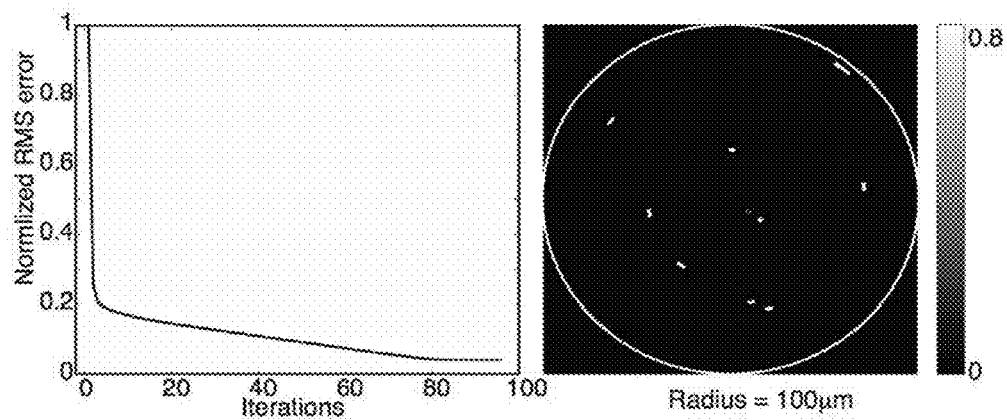

In order to perform general microscopy, it is important to enable imaging a complex (arbitrary) distribution of fluorophores. FIG. 5A shows simulation results of imaging ten fluorophores that are distributed in a random fashion across the field of view 505, which is defined by the aperture of the cannula 510 (radius=100 µm). After reconstruction, the image can be recreated by identifying the locations of all the fluorophores as illustrated in FIG. 5C. As explained earlier, since the corresponding lookup table has all possible locations calibrated, the DBS algorithm can be applied to reconstruct any arrangement of such molecules. FIG. 5B illustrates this principle by the dramatically reduced RMS error (normalized) as a function of the iteration. No localization algorithms have been applied in this example. Resolution is determined by the localization precision, as is described in greater detail below.

The same underlying technique for imaging fluorophores in 2D (two-dimensional) space can also be used to image the fluorophores in 3D space. A simplified example application to 3D space is illustrated in FIG. 6A-6C. FIG. 6A illustrates an on-axis fluorophore 605 which emits fluorescence 610 the travels a length of the cannula 615 and is recorded at image plane 620 to produce the corresponding image. FIG. 6B illustrates an example with two fluorophores 605, one on-axis and the other spaced 100 nm in the transverse plane and 500 nm in the longitudinal plane from the first. Fluorescence 610 emitted from the two fluophores 605 is then collected at image plane 620 to form the corresponding image. FIG. 6C depicts that by ensuring that images of single fluorophores in the lookup table are available for all points in the 3D space of interest, the DBS algorithm can be applied to reconstruct the location of the two fluorophores.

In this example, the lookup table with images of single fluorophores for each location within the 3D space of interest can be built during calibration. After calibration and creation of the lookup table, the algorithm proceeds as explained previously. In the example of two fluorophores, where one is spaced 100 nm in the lateral direction and 500 nm in the longitudinal direction from the other, as in FIG. 6B, the DBS algorithm is readily able to distinguish between the two as indicated by the very low RMS error in the images at the end of the iterations. This same principle can be applied, regardless of the number of fluorophores, i.e. several, dozens, hundreds, or even thousands.

In order to simultaneously image and track different molecules, different fluorophore labels can be used. These labels can emit fluorescence at distinct center wavelengths. Accordingly, the present technology is able to distinguish these labels, as illustrated by the example in FIG. 7. FIG. 7 illustrates imaging of two different fluorophores emitting at different wavelengths. FIG. 7A illustrates an on-axis fluorophore 705 emitting at $\lambda=640$ nm, which forms an image at the output image plane 720 as shown. This example image was created using a simulation. FIG. 7B illustrates two fluorophores 705, including one emitting at $\lambda=640$ nm and the other emitting at $\lambda=560$ nm spaced a distance of 100 nm apart produce an image shown. FIG. 7C illustrates that the DBS algorithm is clearly able to separate out the two fluorophores as indicated by the normalized RMS error vs. iteration plot.

In the example of FIG. 7A-7C, as with the example of FIG. 6A-6C, the lookup table of data can be prepared with all possible locations of both fluorophores. However, the calibration can be performed offline prior to imaging and can be stored. The present technology can be extended to many more spectrally distinct fluorophores (e.g. limited only by channel capacity theorem and available distinct fluorophores). Although reconstruction of an image can involve multiple iterations, such as up to 100 iterations in some instances, this process can be performed in post-processing and does not have to be done in real time. The number of fluorophore locations stored within the lookup table within the region of interest can be based on desired resolution, resolvable distance for a given fluorophore, and the like. As a general guideline resolvable distance depends on the technique utilized (e g diffraction resolution limit, PALM, STORM, etc) while the field of view is limited by an aperture size of the cannula which is many cases can be about 50 µm to 400 µm, although other dimensions can be used.

In examples having sparsely labeled samples, the localization precision of the fluorophore can be considerably better than the far-field diffraction limit. This enables super-resolution imaging in a wide-field configuration. This property is exploited in techniques such as photoactivation localization microscopy (PALM) and stochastic optical reconstruction microscopy (STORM), where a sparse subset of fluorophores is activated (usually with a low intensity widefield illumination) in each frame. In other words, closely spaced fluorophores are separated in time (imaged in different frames). Subsequent image processing can then reconstruct images with exquisite resolution. In light guided computational super-resolution imaging (LCSI), the same principle can be applied. However, instead of fitting to a conventional Gaussian point-spread function, the images can be fit to the distributed light intensity distribution for each location of the fluorophore (as illustrated in FIG. 3B-3D). When implemented properly, resolution can be available down to a 10 nm level, even in three dimensions.

The proposed system is simple and does not involve any additional required optics (other than the cannula, which is already used for optogenetic stimulation). In addition, the approach can be extended to 3D imaging, sub-100 nm resolution, multi-color imaging and can be fast. Since all or nearly all of the photons that are emitted from the fluorophore that are guided by the cannula are used for imaging, the overall photon throughput (or usage) is very high. This is useful when imaging dim fluorophores and for fast imaging. In the case of sparsely labeled regions, localization techniques can be applied to achieve super-resolution in a manner similar to that in PALM or STORM techniques.

A characterization system is illustrated in FIGS. 8A-8D. FIG. 8A illustrates calibration on a bench-top system. The calibration setup is illustrated in FIG. 8A where a sample on a glass slide 830 with a spatially sparse arrangement of fluorophores (such that there is only 1 fluorophore within the field of view of the cannula) is scanned on a precise X-Y-Z stage for calibration. For each scan location of the slide, the camera 840 image is recorded. This series of images forms the lookup table 835 (FIG. 8D) for the optimization routine described previously. Note that the image of the on-axis fluorophore would be the point-spread function (PSF) of the system, which can then be used for precise localization based upon photon statistics. FIG. 8A illustrates a light source 805 which typically provides either blue or white light for excitation of the fluorophores on the glass slide 830, although other stimulation or excitation light can be used depending on the fluorophores. The excitation light travels through an optical fiber 810 coupled to a mating sleeve 815, through a dichroic mirror 820 oriented within the mating sleeve 815, and into a cannula 825. Fluorescence emission from the fluorophores passes through the cannula 825 to the dichroic mirror 820 and is reflected toward the camera 840 (e.g., CCD camera) where the emission is imaged. Lenses at the ends of the mating sleeve can be used to transfer the image from the face of the cannula to the correspondence camera sensor and to transfer excitation light into the cannula.

FIG. 8B illustrates super-resolution imaging on a bench-top system. FIG. 8B illustrates imaging an unknown sample using the cannula. It is noted in this system there is no scanning performed as in the system of FIG. 8A, but rather a single frame image is taken. As explained earlier, the binary-search algorithm can be applied to reconstruct the fluorophore distribution from this image. This system can be used to understand the signal-to-noise limitations for super-resolution imaging. Furthermore, since no scanning is done, imaging can be performed rapidly and can be limited only by the frame rate and sensitivity of the camera.

FIG. 8C illustrates an implantable cannula, mating sleeve and optical fiber, where the mating sleeve is configured to incorporate a dichroic mirror (e.g. commercially available from Andor Corp.) and a micro-camera. The excitation light source 805 in FIG. 8A can be a fiber source with either blue (~470-480 nm) or white light. The excitation light is coupled through collimating 845 and focusing 850 lenses (FIG. 8B) onto the cannula 825, which guides the light to a microscope slide 830. Fluorescence from the sample on the slide 830 is collected by the cannula 825 and guided back to the dichroic mirror 820 onto a CCD camera 840.

FIG. 8D illustrates a system including a computer for processing images captured by the micro-camera 840. A computer 860 having a processor 850 and a memory 855 may be electrically coupled to the micro-camera 840 and optionally to the light source 805. The computer 860 may optionally control operation of the light source 805. The computer 860 may receive image data received by the micro-camera 840. A lookup table or calibration data store 835 may be created in advance of imaging an unknown sample, as has been described. Furthermore, the computer may use a reconstructor 840 and the lookup table 835 to reconstruct the data representing the sample. An image creator 845 may then create a visual image based on the reconstructed data.

In a photomask fabrication process, a customized pattern including pinholes of different sizes for calibration and other geometries for imaging a sample can be patterned in a chromium photomask. The photomask can be a standard four-inch chromium photomask, which is a glass substrate with 530 nm of AZ1500 resist on top of 120 nm of a deposited chromium layer baked for 30 minutes at 103° C. The photomask can be patterned, for example, using a Heidelberg MicroPG 101, UV- laser scanning pattern generator. Geometries for patterning can be created in AutoCAD and saved in DXF format. Using the provided software (e.g., MicroPG 101 exposure wizard) the prepared file is fed to the pattern generator. A laser power of 12 mW and exposure level of 50% can be set in the wizard. The patterned area of the mask is exposed according to the CAD file once the exposure starts. The exposed mask is developed and etched and then residual photoresist can be removed using a resist-stripping chemical. The mask can be investigated under a light-field microscope to verify the lithography result.

Figure 9:
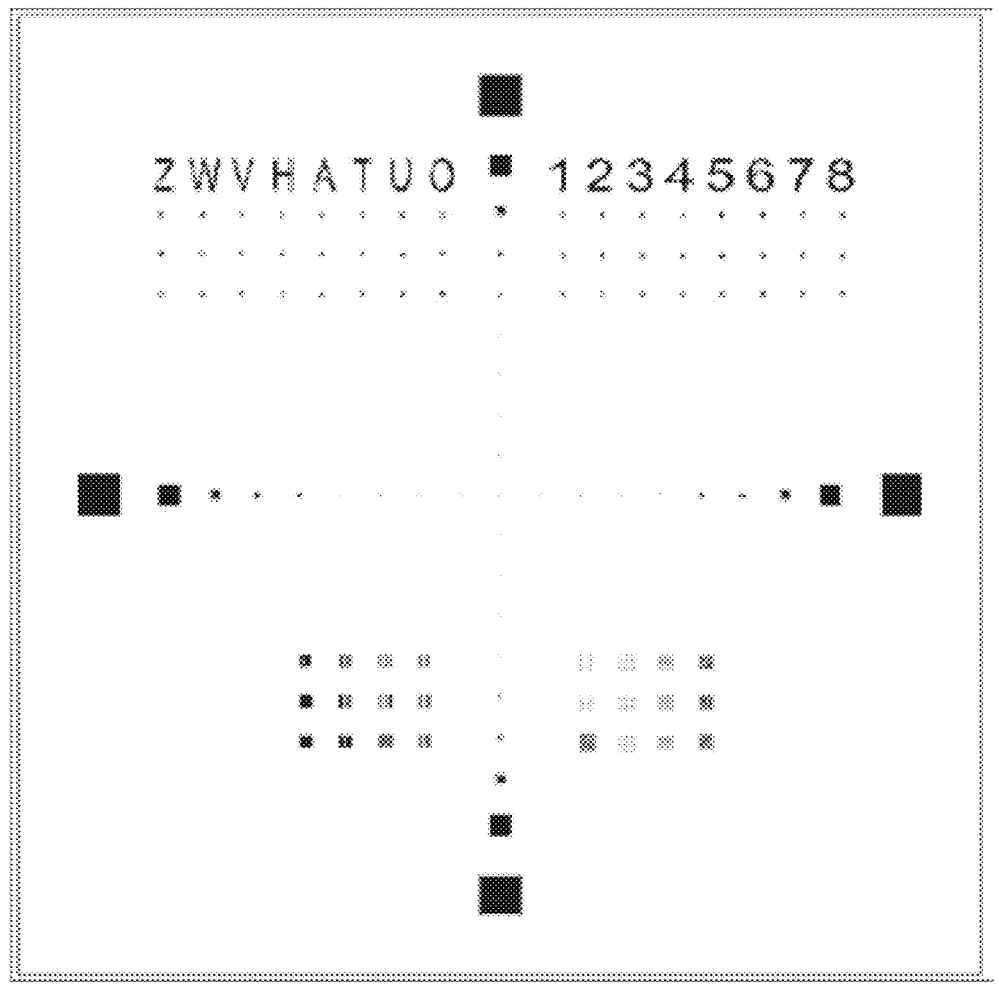
FIG. 9 illustrates an example pattern fabricated on a photomask in accordance with an embodiment of the present technology.

FIG. 9 illustrates an example pattern fabricated on a photomask. Different sizes of squares are placed along the axis to be used for calibration. Squares with gradually decreasing sizes are placed along the axis for locating smaller square pinholes easily. Letters and numbers used as sample objects are placed at the top-left and top-right, respectively. Lines of various widths and spacings are placed at the bottom-left, and square grids are placed at the bottom-right.

Figure 10A:
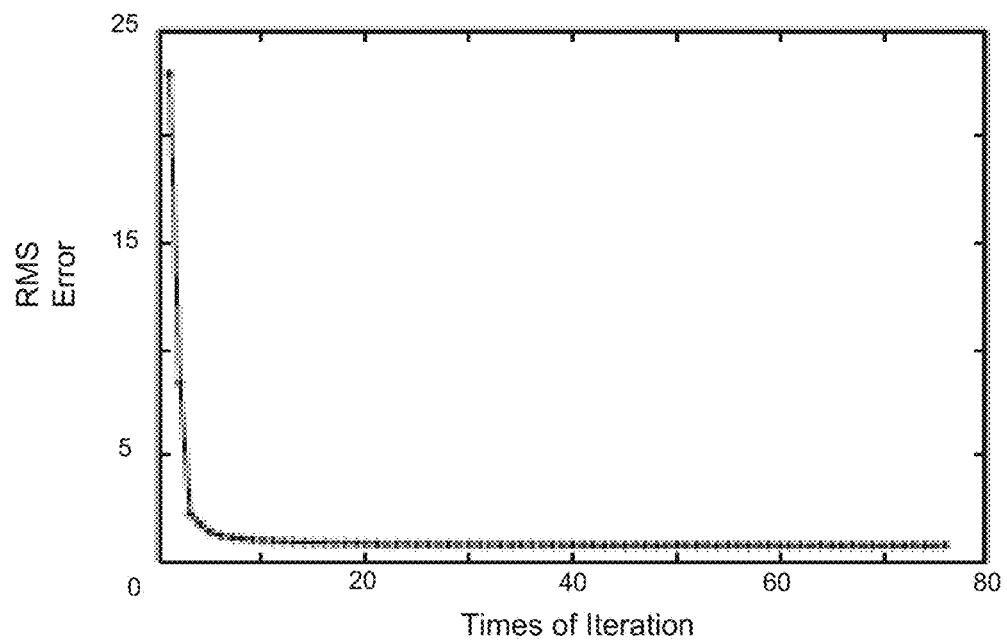
FIG. 10A and 10B are graphs demonstrating the convergence of the direct-binary-search algorithm for reconstructing an object in accordance with an embodiment of the present technology.
Figure 10B:
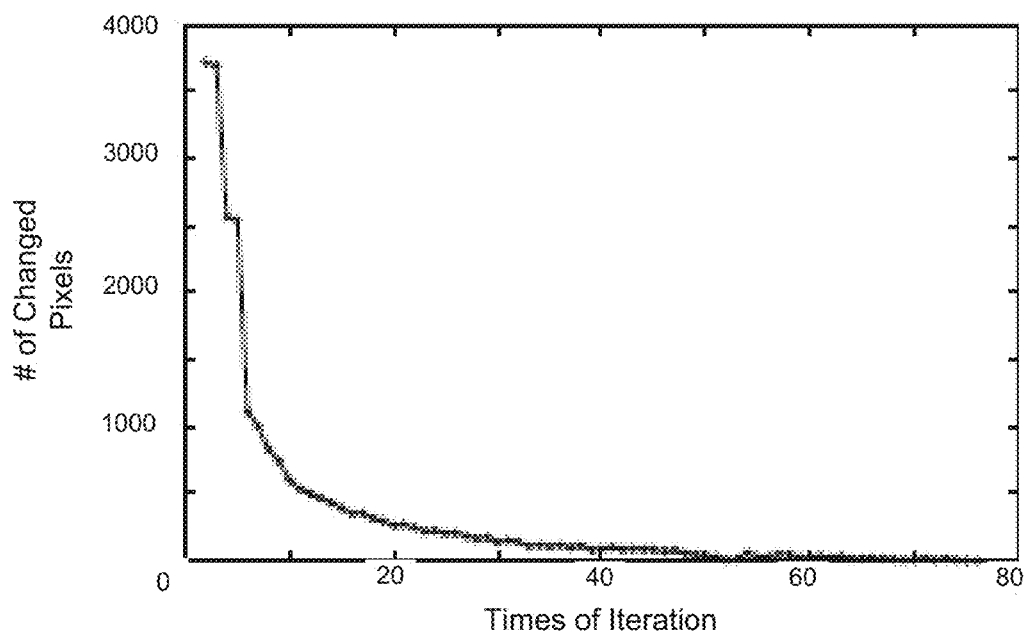

The direct-binary-search algorithm can be implemented in a suitable software program (e.g. MATLAB) to perform object reconstruction. One difference from the traditional DBS is the use of multilevel instead of binary level. Perturbation size defines the difference between each level. Therefore a small perturbation size implies a subtle change in the recovered object per iteration, and thus slower convergence toward the solution. The drawings accompanying this application represent the result of DBS with a perturbation size of 0.005. An iteration terminates when no pixel change has been detected. FIG. 10A illustrates the convergence of the DBS algorithm for reconstructing a number-2 object. Zero initial solution and 0.005 perturbation size is used. The illustrated DBS session converged after 78 iterations that took about 5 minutes. FIG. 10B shows the corresponding decrease in the number of changed pixels as a function of iteration.

A number of image-processing techniques can be used to precondition the captured cannula images before they are input to DBS script. In one specific example, HDR (high-dynamic-range) is a technique used to preserve the information of the image otherwise lost when underexposed and overexposed. The Unibrain Fire-i400 provides a control to change exposure in 511 levels. Each exposure level corresponds to the exposure time that a manufacture specifies. First, images are taken at 51 different exposure levels to perform film function recovery. Calibration images are taken at 8 different exposure levels, which are determined to cover the exposure from a mostly-underexposed exposure level to a mostly-overexposed exposure level. A recovered film function is used to build an HDR image of each calibration image. HDR images are built in the same manner for object images at multiple exposure levels, properly chosen to include underexposure to overexposure levels, but not necessarily at same exposure levels used for capturing calibration images. Also, to eliminate the effect of background leakage light, the cannula HDR image of the leakage light is captured by moving the cannula aperture to a blocked position completely blocked by the chromium photomask. The leakage light image is the subtracted both from each calibration image as well as the object image. Each image is cropped to the region of interest to reduce the image size, which helps to speed up the optimization process. The boundary of the cropping is defined by the background image, as it bounds the region where the most of the optical power exits, and also because the region where background subtraction did not occur cannot be used for reconstruction. By utilizing the aforementioned computational technique, high quality images that well preserve the intensity profile of the cannula speckle patterns with can be built using a relatively low priced camera.

Figure 11:
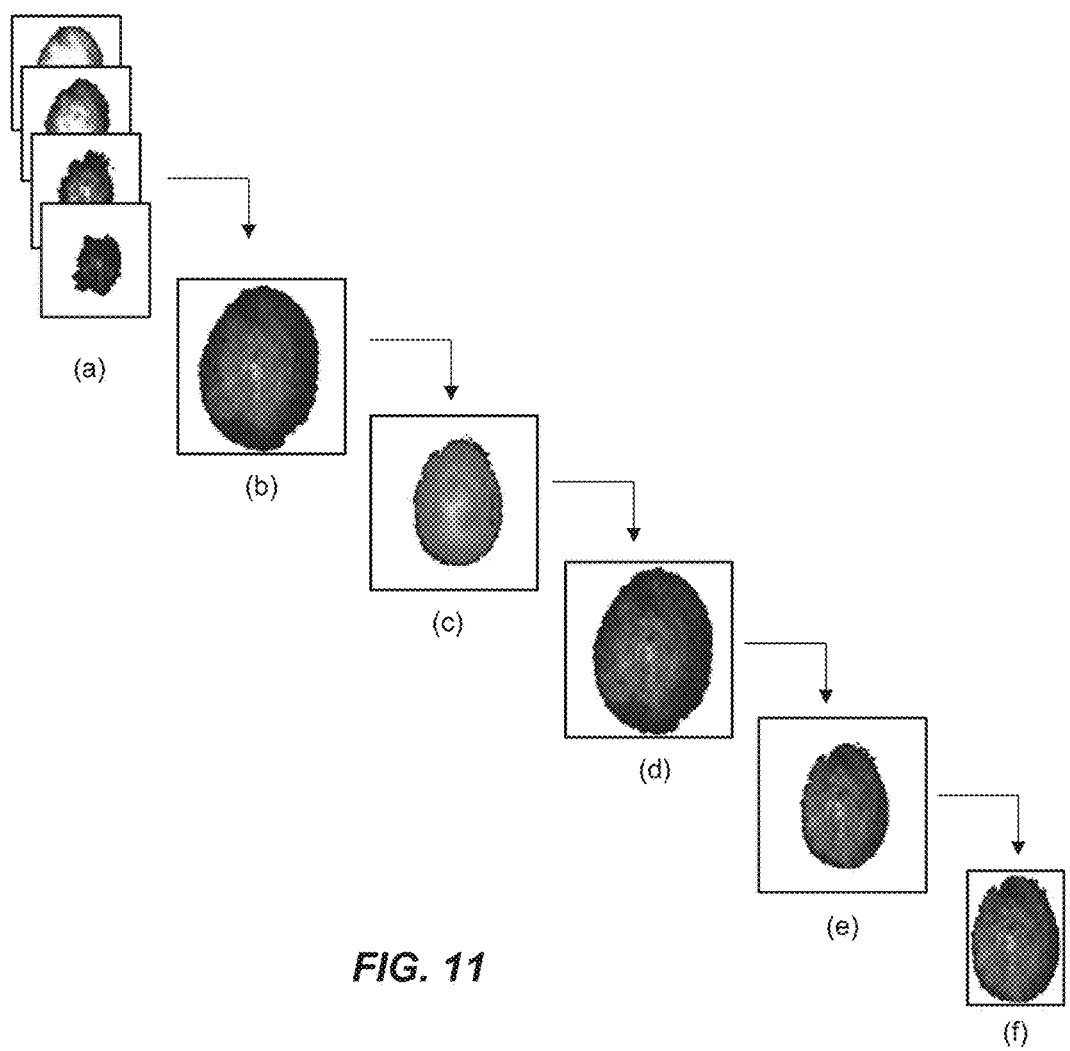
FIG. 11 is a flow diagram illustrating pre-conditioning of captured cannula images in accordance with an embodiment of the present technology.

FIG. 11 illustrates the pre-conditioning of the cannula images described in the previous paragraph. Specifically, FIG. 11 depicts a flow chart of pre-conditioning of the captured cannula images. The end product of the preconditioning is a truncated 295 pixels by 281 pixels HDR image with a high signal-to-noise ratio. (LDR=low-dynamic range. HDR=high-dynamic range). At (a), LDR images are captured using light at multiple exposure levels to create an HDR image, as shown at (b). The "background," or intensity that passes through the chrome opaque barrier in the photomask, illustrated at (c) can be subtracted from the HDR image in (b) to achieve the HDR image shown at (d). Pixels outside of the region of interest may be discarded from the image in (d), resulting in the image at (e). Blank pixels surrounding the region of interest may be truncated, as shown at (f), to result in an HDR image which is used for reconstruction.

Figure 12A:
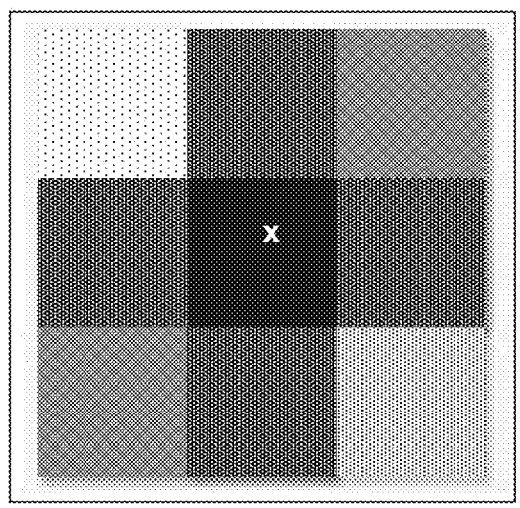
FIG. 12A-12B illustrate the prediction of a location of features within a reconstructed image with finer accuracy than the calibrated step size by using a weighted centroid in accordance with an embodiment of the present technology.
Figure 12B:
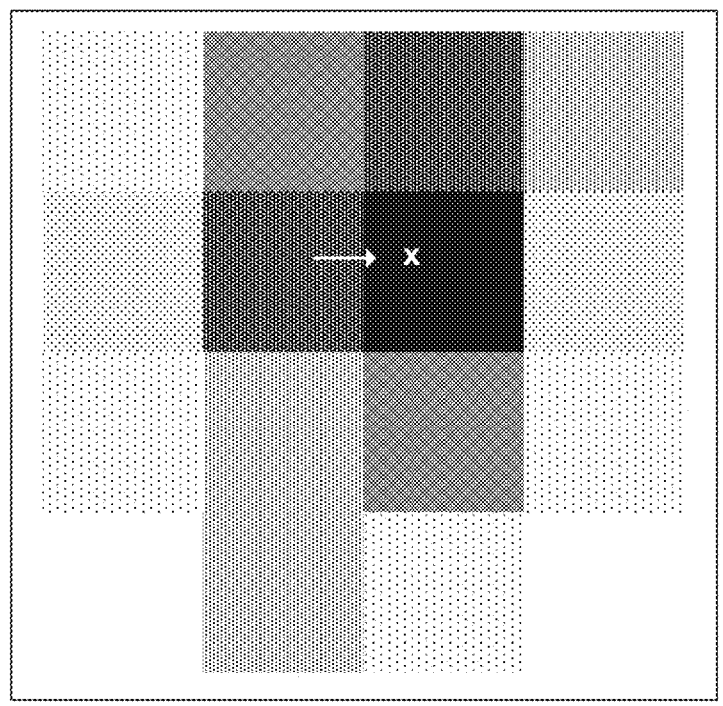

To test the sensitivity of the device, the weighted centroid of the object image can be found to determine the pinhole location with resolution less than the calibration step size. The weighted centroid of the x-axis is calculated as $x_c$=sum (x*p)/sum(x), where x is the position and p is the amplitude of the corresponding pixel. Weighted centroids of the y-axis and z-axis are calculated in the same manner. For example, FIG. 12A shows the zoomed-in view of the 10 μm square-pinhole reconstruction with the weighted centroid of the object, indicated by an 'x' marker. FIG. 12B is the reconstruction result of the same 10 μm spare pinhole, shifted by 1 μm in the x direction. While the resulting image does not clearly show the shift, as the shift is less than the size of pixel, the weighted centroid, or the red marker, the resulting image provides accurate quantitative location information from the pixel lump and measures about 1.2 μm in centroid shift. Therefore, when the object is moved by a step size smaller than the calibration step size, the location of features within the reconstructed image can be predicted with finer accuracy than the calibration step size by using weighted centroid. In examples where the object is composed of multiple, isolated point sources, such as a fluorophore slide, a weighted centroid of each object can be found by sectioning the image into connected-component pixel groups to perform centroid calculations of each component.

The methods and systems of certain embodiments can be implemented in hardware, software, firmware, or combinations thereof. In one embodiment, the method can be executed by software or firmware that is stored in a memory and that is executed by a suitable instruction execution system. If implemented in hardware, as in an alternative embodiment, the method can be implemented with any suitable technology that is well known in the art.

Also within the scope of an embodiment is the implementation of a program or code that can be stored in a non-transitory machine-readable medium to permit a computer to perform any of the methods described above.

Some of the functional units described in this specification have been labeled as modules, in order to more particularly emphasize their implementation independence. The various modules, engines, tools, or modules discussed herein can be, for example, software, firmware, commands, data files, programs, code, instructions, or the like, and can also include suitable mechanisms. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code can be a single instruction, or many instructions, and may even be distributed over several different code segments, among different programs, and across several memory devices. Similarly, operational data may be identified and illustrated herein within modules, and can be embodied in any suitable form and organized within any suitable type of data structure. The operational data can be collected as a single data set, or can be distributed over different locations including over different storage devices. The modules can be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. An imaging system, comprising:
   an optical fiber;
   a cannula configured for implantation into a subject;
   a mating sleeve coupling the cannula to the optical fiber;
   a light source coupled to the optical fiber and configured for providing optical stimulation through the optical fiber to the subject;
   a camera supported by the mating sleeve to capture an optical emission for a single frame image, with no scanning performed, from the subject resulting from the optical stimulation;
   a dichroic mirror secured to the mating sleeve to allow the optical stimulation to pass from the optical fiber to the cannula and to redirect the emission from the cannula to the camera; and
   an image reconstructor electrically connected to the camera and adapted to reconstruct an image of the subject using an electrical signal received from the camera, wherein the image reconstructor reconstructs the image using a linear combination model of intensity distributions.

2. The system of claim 1, wherein the light source is a blue light source.

3. The system of claim 1, wherein the light source is a white light source.

4. The system of claim 1, wherein the linear combination model is two-dimensional.

5. The system of claim 1, wherein the linear combination model is three-dimensional.

6. The system of claim 1, wherein the linear combination model is multi-color.

7. The system of claim 1, wherein the image reconstructor uses a Stochastic-Optical-Reconstruction Microscopy (STORM) based technique to reconstruct the image.

8. The system of claim 1, wherein the image reconstructor uses a Photoactivation-Localization Microscopy (PALM) based technique to reconstruct the image.

9. The system of claim 1, wherein the camera is a micro-camera having a sensor with a sensor diameter smaller than a diameter of the cannula.

10. The system of claim 1, wherein the light source generates incoherent light for the optical stimulation.

11. The system of claim 1, wherein the imaging system comprises no lenses.

12. The system of claim 1, wherein the image reconstructor reconstructs the image using the single frame image captured by the camera.

13. The system of claim 1, wherein the image reconstructor reconstructs the image having a super-resolution.

14. A method, comprising:
   preparing a sample having a region of interest;
   associating the cannula with the sample and directing an opening in the cannula toward the region of interest;
   coupling an optical fiber to the cannula using a mating sleeve, the mating sleeve supporting a camera and a dichroic mirror;
   activating a light source coupled to the optical fiber and providing optical stimulation through the optical fiber to the region of interest;
   redirecting fluorescence emitted from the region of interest in response to the optical stimulation from the cannula to the camera using the dichroic mirror;
   capturing the fluorescence at the camera for a single frame image, with no scanning performed; and
   producing an image of the region of interest from the fluorescence captured by the camera, wherein producing the image comprises producing the image using a linear combination model of intensity distributions.

15. The method of claim 14, wherein the linear combination model is two-dimensional.

16. The method of claim 14, wherein the linear combination model is three-dimensional.

17. The method of claim 14, wherein producing the image comprises producing the image using a Stochastic-Optical-Reconstruction Microscopy (STORM) or Photoactivation-Localization Microscopy (PALM) based technique.

18. The method of claim 14, wherein the camera is a micro-camera having a sensor with a sensor diameter smaller than a diameter of the cannula, and the cannula has a diameter of less than 2 mm.

19. The method of claim 14, wherein the light source generates incoherent light for the optical stimulation.

20. The method of claim 14, wherein the optical stimulation and the fluorescence does not pass through a lens.

21. The method of claim 14, wherein the producing the image is accomplished using the single frame image captured by the camera.

22. The method of claim 14, wherein the image is produced having a super-resolution.

* * * * *